United States Patent [19]

Ieki

[11] Patent Number: 5,750,984

[45] Date of Patent: May 12, 1998

[54] OPTICAL ENCODER USED FOR POSITION DETECTION BASED UPON A PLURALITY OF SIGNALS

[75] Inventor: Atsushi Ieki, Kani, Japan

[73] Assignee: Okuma Corporation, Gifu, Japan

[21] Appl. No.: 589,343

[22] Filed: Jan. 22, 1996

[30] Foreign Application Priority Data

Jan. 23, 1995 [JP] Japan .................................. 7-025773

[51] Int. Cl.$^6$ .............................. H01J 40/14; G01D 5/36
[52] U.S. Cl. ................................ 250/231.16; 250/237 G
[58] Field of Search ..................... 250/237 G, 237 R, 250/231.13, 231.14, 231.16

[56] References Cited

U.S. PATENT DOCUMENTS 5,059,791  10/1991  Ishizuka et al. ................ 250/237 G
5,569,913  10/1996  Ishizuka et al. ................ 250/237 G
5,572,019  11/1996  Sakuma ........................... 250/237 G Primary Examiner—Edward P. Westin
Assistant Examiner—John R. Lee
Attorney, Agent, or Firm—Wenderoth, Lind & Ponack

[57] ABSTRACT

An optical encoder comprising a first scale and photo sensitive elements that shift relative to the first scale along the length of the first scale for determining a relative position based on a plurality of signals having a predetermined phase difference from the photo sensitive elements. The optical encoder comprises groups of photo sensitive elements, wherein each group comprising a plurality of photo sensitive elements arranged side by side in the direction of the length, and wherein each photo sensitive element has a width corresponding to the width of the pattern of the first scale. The groups of photo sensitive elements corresponds respectively to the plurality of signals. The photo sensitive elements belonging to one photo sensitive element group and the photo sensitive elements belonging to the other photo sensitive element group are arranged side by side in a mixed fashion in the direction of the length. One photo sensitive element group and the other photo sensitive element group are arranged so that the signal derived from the one photo sensitive element group and the signal derived from the other photo sensitive element group have a predetermined phase difference therebetween.

7 Claims, 7 Drawing Sheets

OPTICAL ENCODER USED FOR POSITION DETECTION BASED UPON A PLURALITY OF SIGNALS

BACKGROUND OF THE INVENTION

1. Field of the Invention

The present invention relates to an optical encoder that is used for position detection in the field of machine tools and semiconductor equipment.

2. Description of the Related Art

The prior art optical encoders typically comprise a first diffraction grating (hereinafter simply referred to as "first grating") and a second diffraction grating (hereinafter simply referred to as "second grating"), wherein the second grating 2, as shown in FIG. 1, is disposed behind the first grating in a manner such that the second grating moves relatively in the direction of the length of the first grating. Furthermore, the photo sensitive section 3 as shown in FIG. 2 is disposed behind the second grating 2. The first grating and the second grating 2 are each provided with grating blocks, where in a portion that transmits light (hereinafter referred to as "light transmissive portion") and a portion that is unable to transmit light (hereinafter referred to as "light non-transmissive portion") alternate spatially at predetermined spacings (hereinafter referred to as a "grating pitch P"). The second grating 2 is made up of four grating blocks a, b, a/ and b/ as shown in FIG. 1. As shown, these grating blocks are positioned with phase differences of P/4, P/2 and 3P/4 therebetween.

In the construction described above, when a parallel light beam L is directed to the first grating, the light beam that has been transmitted through the first grating and the four grating blocks of the second grating 2 reaches, respectively photo sensitive elements a, b, a/ and b/ of the photo sensitive section 3. Each of the photo sensitive elements a, b, a/ and b/ of the photo sensitive section 3 converts an incident light into an electrical signal, according to the intensity of the incident light, and outputs the electrical signal.

A variation in the electrical signal occurs as the intensity of the light, transmitted through the first grating and the second grating 2, changes due to a relative displacement between the first grating and the second grating 2. Ideally, the electrical signal would be a triangular signal that is proportional to an apparent variation in the light transmissive portions, viewed from the light incident side, due to the overlap state of the first grating and the second grating 2. In practice, however, the electrical signal contains a diversity of distortion components because of light diffraction and the like. A position detection is performed based on the approximation that the electrical signal is a pseudosinusoidal wave. The position detection is performed using a plurality of signals (two-phase, three-phase, four-phase, etc.) having predetermined phase differences therebetween. In a known method, for example, two-phase signals of a SIN-signal and a COS-signal are generated with a 90° phase difference therebetween, and position is determined by computing an arc tangent from these signals. To this end, a plurality of phase signals are derived from the second grating 2 and the photo sensitive section 3 shown in FIGS. 1 and 2, respectively.

In the prior art optical encoder thus described, the pickup positions of the phase signals are spaced apart with each other as shown in FIG. 1. When position detection is performed, the phase signals suffer from an unbalance because of the effect of the dirt, blemishes, or errors of the first grating, and such an unbalance can lead to a positioning error. Variations in parallelism and intensity of the light from a light source give rise to variations between the phase signals. To prevent optical cross-talk between the phases, spacing should be allowed between the phases on the second grating 2 and the photo sensitive elements on the photo sensitive section 3, and such a spacing requirement contributes to the bulky design of the encoder. Furthermore, since the signal containing distortion components is used as the pseudo-sinusoidal signal for position detection, a large discrimination error is introduced. The distortion factor of a displacement signal, derived from the prior art optical encoder, substantially changes when the separation between the first grating and the second grating 2 varies. To keep the resulting error within a certain range, the separation between the first grating and the second grating 2 should be maintained at an appropriate distance. As a result, rigorous accuracy requirements are imposed in the mounting of the gratings.

To resolve the latter problem, an optical encoder that removes an n-th order or harmonic distortion components by arranging neighboring patterns at unequal spacings and with predetermined phase differences therebetween has been proposed. (Japanese Laid-open Patent Application No. 3-48122). However, this optical encoder still suffers from the former problem since the pickup positions of the phases.

SUMMARY OF THE INVENTION

The present invention has been developed in view of the above problems, and it is an object of the present invention to provide an optical encoder that permits the pickup of the phases at positions as close as practicably possible and to provide a displacement signal with reduced distortion.

The optical encoder of the present invention comprises a first scale and light sensitive elements that shift, relative to the first scale, in the direction of the length of the first scale, wherein a relative position is determined based on a plurality of signals having a predetermined phase difference from the photo sensitive elements. To achieve the above object, the present invention comprises groups of photo sensitive elements, wherein each group comprises a plurality of photo sensitive elements arranged side by side in the direction of the length, wherein each photo sensitive element has a width that corresponds to the width of the pattern of the first scale, wherein the groups correspond to the respective phase signals, wherein the photo sensitive elements belonging to one photo sensitive element group and the photo sensitive elements belonging to the other photo sensitive element group are arranged side by side in a mixed fashion in the direction of the length, whereby one photo sensitive element group and the another photo sensitive element group are arranged so that the signal derived from the one photo sensitive element group and the signal derived from the other photo sensitive element group have a predetermined phase difference therebetween.

Since the optical encoder of the present invention has photo sensitive elements for each phase arranged in a mixed fashion and in a grating configuration on a photoelectric conversion element, pickup of each phase is performed substantially on the same area. Even on the same phase, spacings between photo sensitive elements are not uniform. Relative to a photo sensitive element working as a reference phase, the other photo sensitive elements are arranged so that they have, at steps of a multiplication of P, phase differences of P/(2·l), P/(2·m), P/(2·n), P/(2·o) and phase differences that are the sum of a combination of these phase differences. Therefore, the optical encoder of the present invention is able to remove distortion components of low to high orders at the same time, and is able to eliminate even-order harmonics.

DESCRIPTION OF THE PREFERRED EMBODIMENTS

Figure 1:
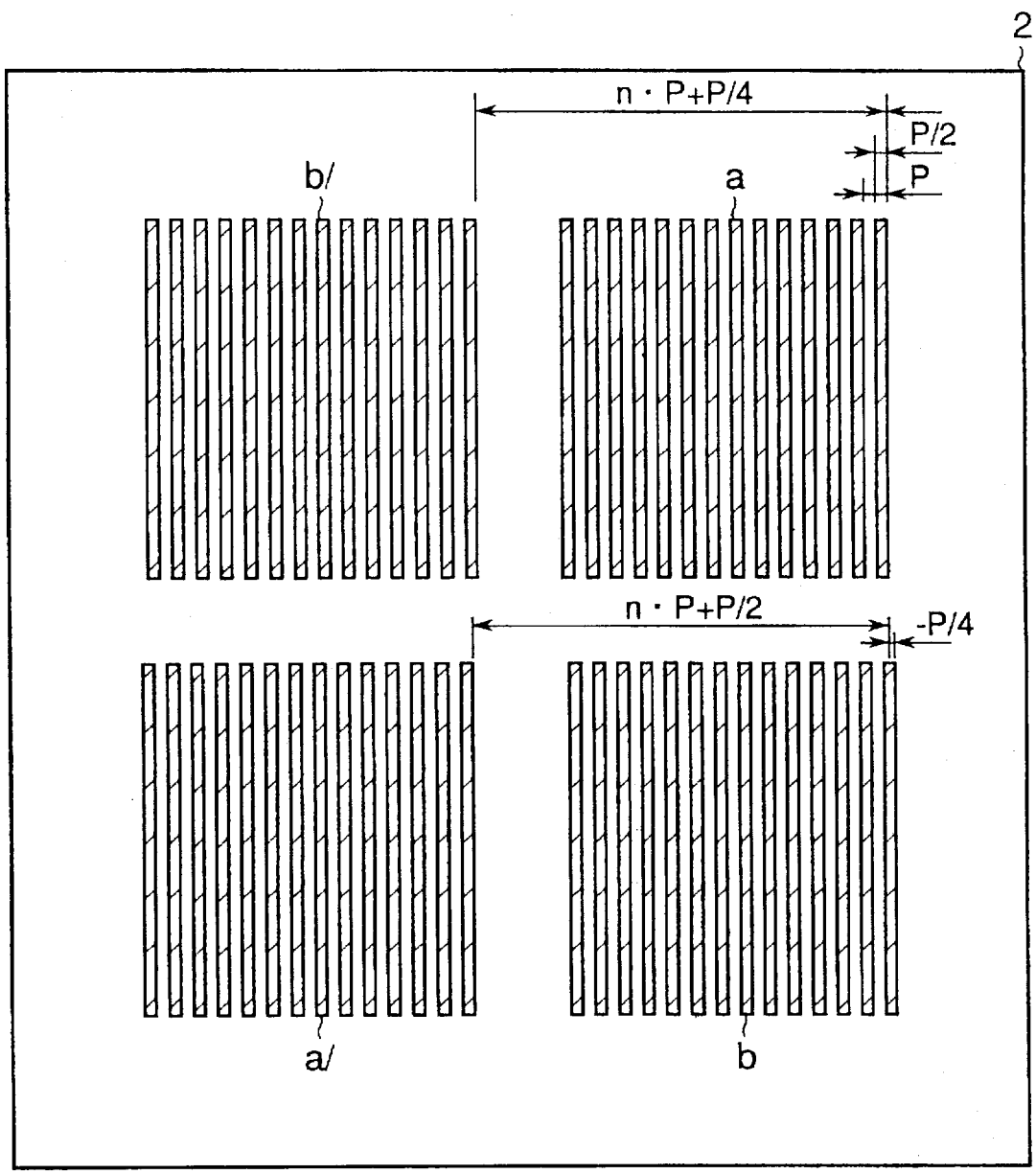
FIG. 1 shows an example of the second grating of the prior art optical encoder.
Figure 2:
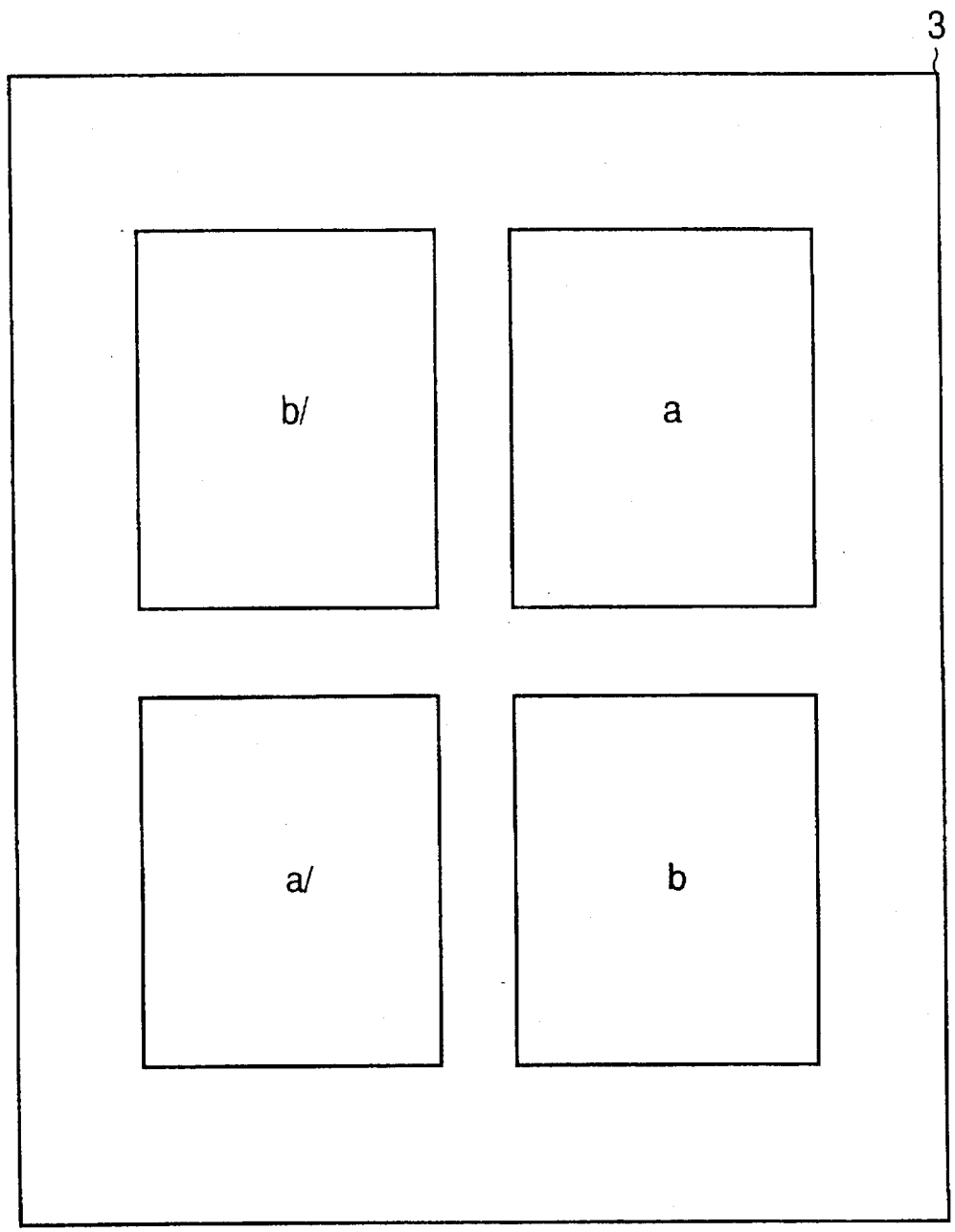
FIG. 2 shows an example of the photo sensitive section of the prior art optical encoder.
Figure 3:
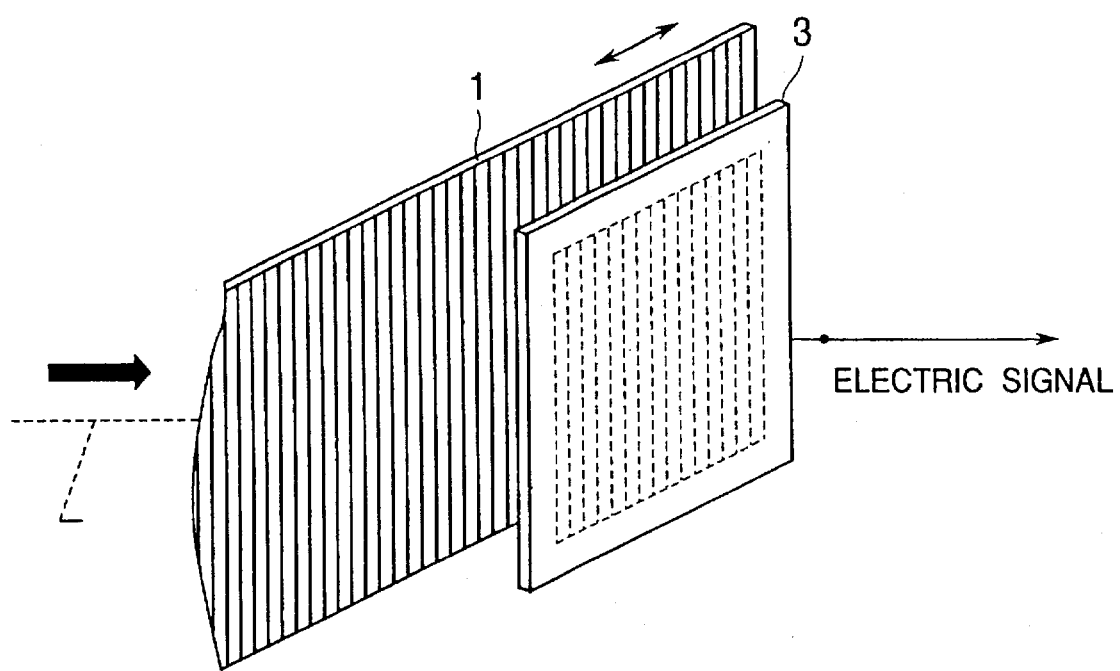
FIG. 3 is a perspective view showing an embodiment of the optical encoder of the present invention.

FIG. 3 is the perspective view showing the embodiment of the optical encoder of the present invention. A photo sensitive section 3 that shifts relative to a first diffraction grating (hereinafter referred to as "first grating") 1 in the direction of the arrow is disposed behind the first grating 1. In this optical encoder, the photo sensitive section 3 has photo sensitive elements 31 arranged in a grating or layout pattern as shown in FIG. 4.

Figure 4:
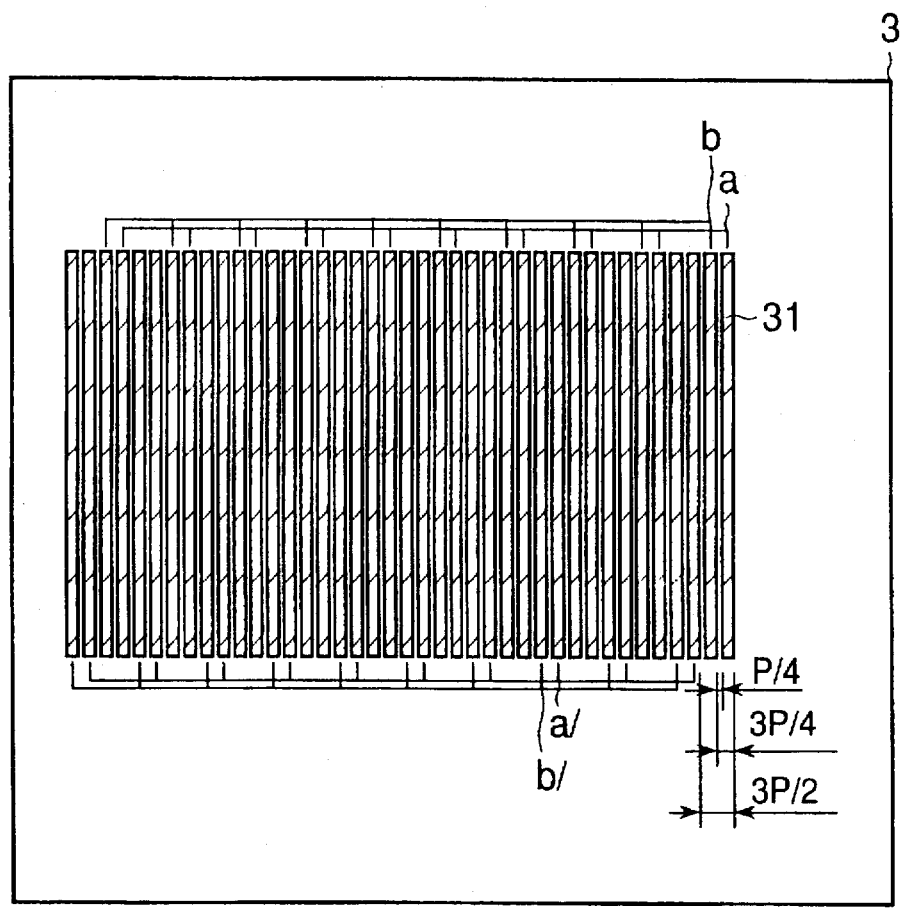
FIG. 4 shows the first alternate example of the embodiment of FIG. 3.

The photo sensitive elements 31 of the photo sensitive section 3 shown in FIG. 4 are spaced apart at spacings ranging from several μm to several hundred μm. This layout pattern is adapted for an optical encoder that outputs 4-phase signals a, b, a/ and b/ (0°, 90°, 180°, 270°). In this embodiment, P represents the pitch for the first grating 1, and the width of the photo sensitive element 31 is represented by P/2. With a spacing of P/4, another photo sensitive element 31 comes next in succession to the first photo sensitive element 31. When one photo sensitive element 31 assigned for signal a is designated 31a, the photo sensitive element for signal b next to 31a is designated 31b, the photo sensitive element for signal a/ next to 31b is designated 31a/, and the photo sensitive element for signal b/ next to 31a/ is designated 31b/. Then, a photo sensitive element 31a is repeated again. The layout pattern spatially alternates the above arrangement. In this case, signal Ia is derived from the photo sensitive element 31a as expressed by the following equation (1).

$$Ia(x) \propto \Sigma 1/k^2 \cdot \cos(\pi M k^2) \cdot \sin(2\pi k x/p) + B \quad (1)$$

where k: odd number

M: $\lambda Z/P^2$

λ: wavelength of the light from a light source

Z: separation between the first grating 1 and the photo sensitive section 3

P: grating pitch of the first grating 1 x: relative displacement

B: DC component

Ib, Ia/ and Ib/ derived from the photo sensitive elements 31b, 31a/ and 31b/, respectively, are expressed by equations (2) through (4) as follows:

$$Ib(X)=Ia(X-\pi 2) \quad (2)$$
$$Ia/(X)=Ia(X-\pi) \quad (3)$$
$$Ib/(X)=Ia(X-3\pi 2) \quad (4)$$

Signals Ib, Ia/ and Ib/ differ in phase by 90°, respectively.

In the above arrangement, every fourth photo sensitive element is the one for the signal a, and the photo sensitive elements for the signal a are internally mutually connected. A plurality of photo sensitive elements for the signal a are collectively designated as a photo sensitive element group for the signal a. The photo sensitive element groups for the signals b, a/ and b/ are designated in the same manner. In this embodiment, 4-phase signals are provided. Alternatively, an arrangement for the output signals of two-phase or three-phase is perfectly acceptable. Furthermore, the photo sensitive elements may be mutually connected so that a differential between Ia and Ia/ and a differential between Ib and Ib/ are picked up. In this case, the photo sensitive elements are placed in a mixed manner in almost the same area and, as a result the intensity of light projected is substantially uniform to every phase and the photo sensitive elements become uniform in characteristics, as well. The use of the differential helps cancel out DC components, that could not have been removed by the prior art arrangement, and thereby presents AC components only.

The arrangement shown in FIG. 4 allows the photo sensitive elements to receive two-third the light beam transmitted through the first grating. In the prior art arrangement, the light beam received by the second grating is half the incident light beam. The present invention thus improves the efficiency by 16.7% over the prior art. Furthermore, since the present invention does not require extra space for preventing inter-phase cross-talk, the efficiency is increased even further in practice. As a result a light emitting element of the present invention with a lower light output intensity is able to obtain the signal of the same level as the prior art, and thus substantial improvements are achieved in power consumption, heat generation, and service life. In this alternate example, however, the resulting signals contain distortion components, and a determined position suffers discrimination error.

Figure 5:
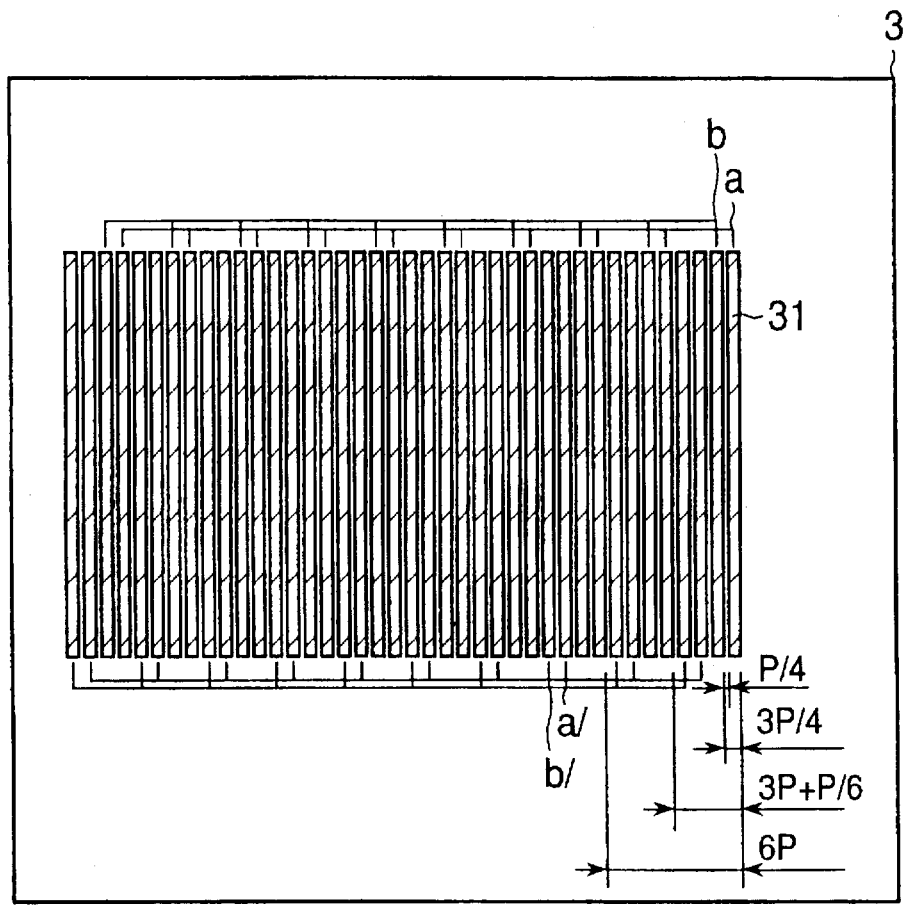
FIG. 5 shows the second alternate example of the embodiment of FIG. 3.

FIG. 5 shows the second alternate example of the embodiment of the present invention in connection with the photo sensitive section that is free from the above-mentioned disadvantage. The layout pattern shown is adapted for an optical encoder that outputs 4-phase signals a, b, a/ and b/ (0°, 90°180°, 270°). This layout pattern is designed to remove periodic or harmonic components that are 1/L times the displacement signal (L=3).

P represent the pitch of the first grating, and the width of the photo sensitive elements 31 is represented by P/2. When a particular photo sensitive element 31, as a reference, assigned for the signal a is designated 31a, the next 31a is placed approximately 3P apart. More accurately, this position is 3P+P/6 in this example (P/6=P/(2·L)). The photo sensitive elements are then placed, in succession from the reference, at 6P, 9P+P/6, 12P, 15P+P/6, . . . . The photo sensitive elements 31b for the signal b are placed with a phase difference of P/4 relative to the respective photo sensitive elements 31a. In the alternate example shown in FIG. 5, the photo sensitive elements 31b are spaced P/4 apart from the photo sensitive elements 31a. A first photo sensitive element 31b is spaced from the reference by 3P/4, and subsequent photo sensitive elements 31b are placed at 15P/4+P/6, 27P/4, 39P/4+P/6, . . . . The photo sensitive elements 31a/, 31b/ are arranged with phase differences of P/2, 3P/4, respectively, relative to the photo sensitive elements 31a.

In summary, relative to one photo sensitive element 31a as the reference, a photo sensitive element 31b is placed at 3P/4, a photo sensitive element 31a/ is placed at 3P/2, and a photo sensitive element 31b/ is placed at 9P/4. In succession, the next photo sensitive element 31a is placed at 3P+P/6, and the next photo sensitive elements 31b, 31a/ and 31b/ are placed at 15P/4+P/6, 9P/2+P/6 and 21P/4+P/6, respectively. Then, the next photo sensitive element 31a is placed at 6P, and the layout pattern of the photo sensitive elements starts over again. The above arrangement of a total of eight photo sensitive elements is repeated over a period of 6P.

The signal Ia, derived from the photo sensitive elements 31a, contains no third harmonic distortion components. This is because the photo sensitive elements 31a are placed in a pattern that cancels out the third harmonic distortion components. The signal Ia is also free from even-order harmonic components. The same is true of the signals Ib, Ia/ and Ib/. The signals Ia, Ib, Ia/ and Ib/ are, one from the next in that order, different in phase by 90°.

As in the first alternate example of the embodiment, every fourth photo sensitive element is the one for the signal a, and the photo sensitive elements for the signal a are internally mutually connected. This is also true of the photo sensitive element groups for the signals b, a/ and b/.

Figure 6:
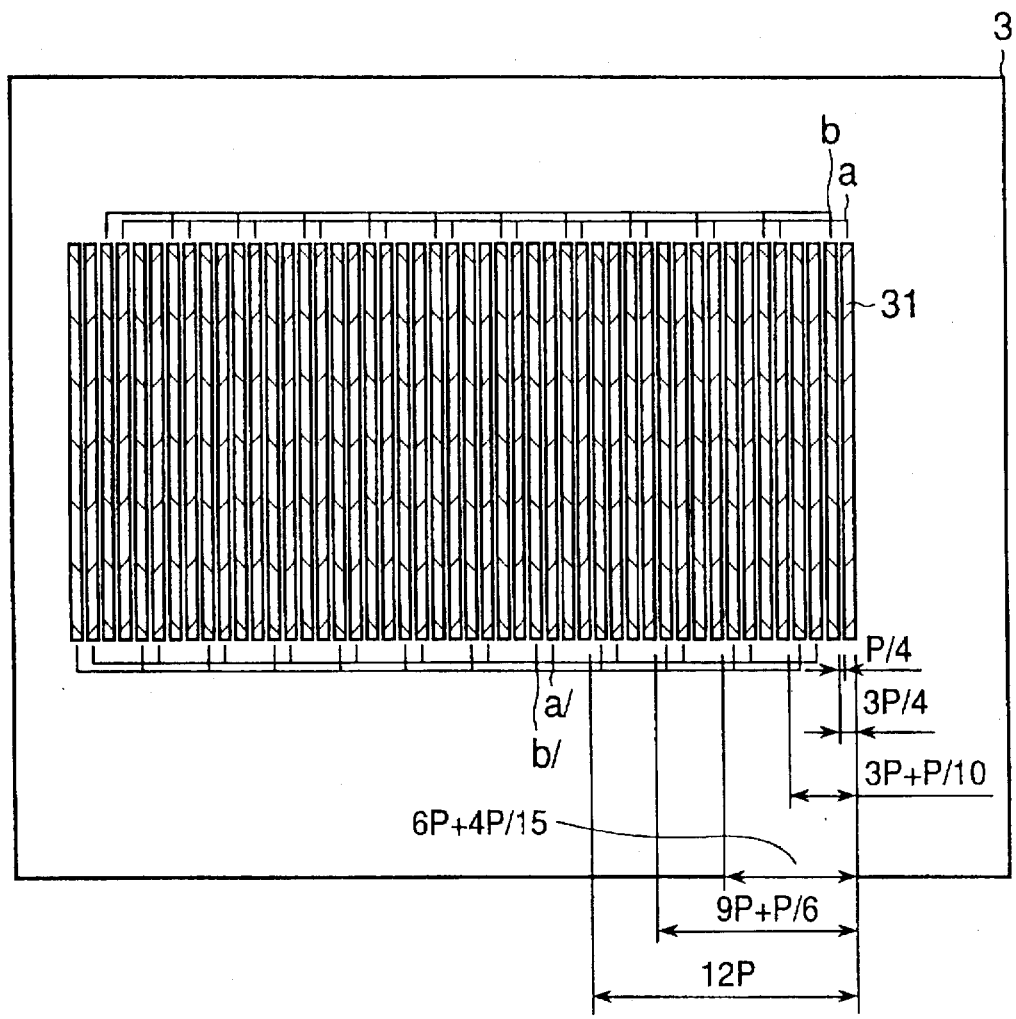
FIG. 6 shows the third alternate example of the embodiment of FIG. 3.

FIG. 6 shows the third alternate example of the embodiment of the present invention. The layout pattern is adapted to an optical encoder that outputs 4-phase signals. The optical encoder is designed to remove periodic or harmonic components that are 1/L times the displacement signal and 1/m times the displacement signal (L=3, m=5). P represents the pitch of the first grating, and the width of the photo sensitive elements 31 is represented by P/2. When a particular photo sensitive element 31, as a reference, assigned for the signal a is designated 31a, the next 31a is placed approximately 3P apart. More accurately, this position is 3P+P/10 in this example. The photo sensitive elements are then placed, in succession from the reference, at 6P+4P/15, 9P+P/6, 12P, . . . .

Unlike the layout pattern in the first example, the third example removes not only the third harmonic distortion components but also the fifth harmonic distortion components. The order in the layout from right to left or vice versa is not limited to the one described herein, and the layout is acceptable as long as it contains the combination (P/10, P/6, 4P/15).

The photo sensitive elements 31b for the signal b are placed in the pattern that presents a phase difference of P/4 relative to the photo sensitive elements 31a. In the alternate example shown in FIG. 6, the photo sensitive elements 31b are spaced of P/4 apart from the photo sensitive elements 31a. A first photo sensitive element 31b is spaced from the reference by 3P/4, and subsequent photo sensitive elements 31b are placed at 15P/4+P/6, 27P/4+P/10, 39P/4+4P/15, 51P/4, . . . . The photo sensitive elements 31a/, 31b/ are arranged with phase differences of P/2, 3P/4, respectively, relative to the photo sensitive elements 31a. In summary, this layout pattern allows a total of 16 photo sensitive elements to be repeatedly arranged with a period of 12P.

The signal Ia from the photo sensitive elements 31a contains neither the third harmonic distortion components nor the fifth harmonic distortion components. This is because the photo sensitive elements 31a are placed in the pattern that cancels out the third harmonic and fifth harmonic distortion components. The signal Ia is also free from even-order harmonic components. The same is true of the signals Ib, Ia/ and Ib/.

Figure 7:
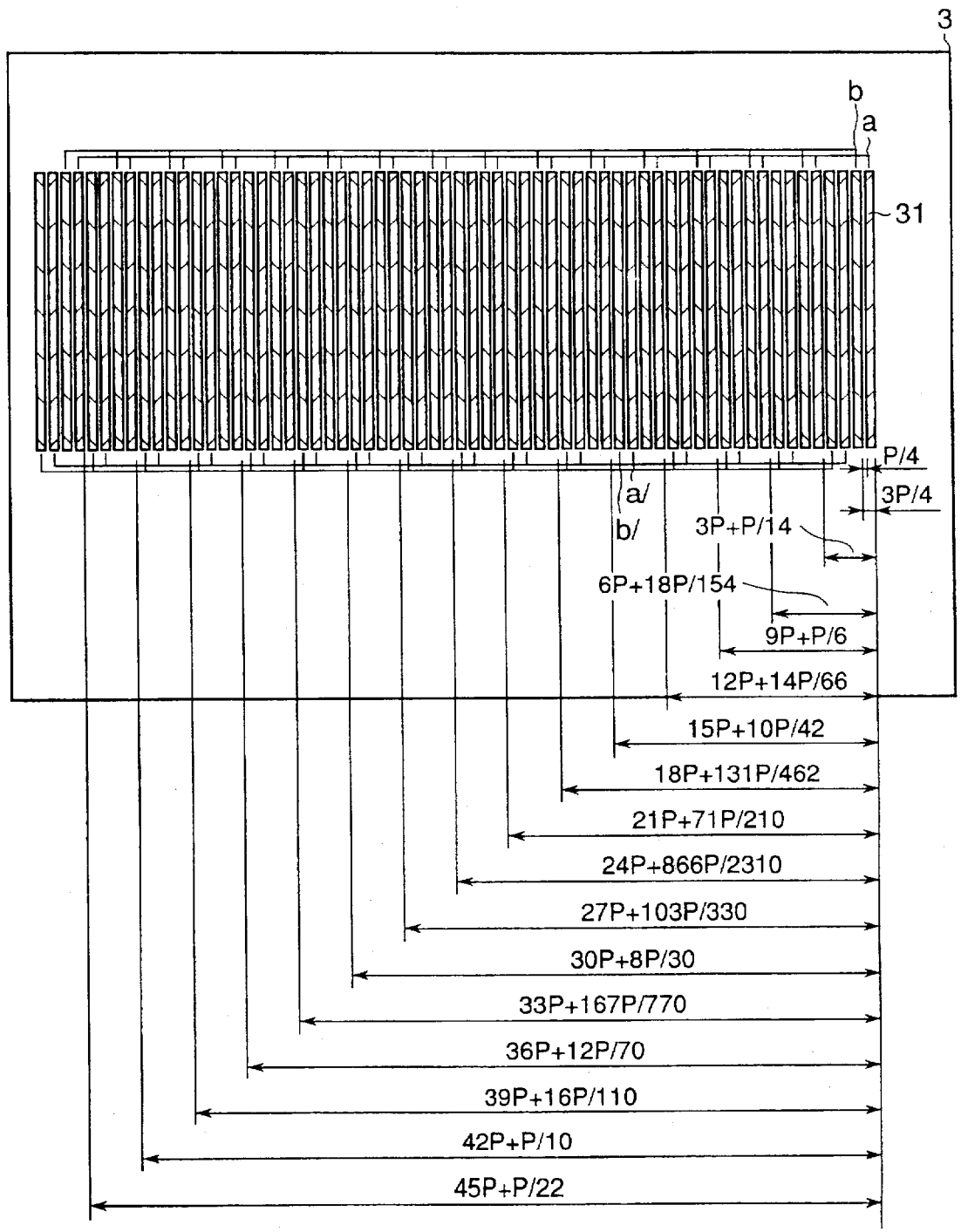
FIG. 7 shows the fourth alternate example of the embodiment of FIG. 3.

FIG. 7 shows the fourth alternate example of the embodiment of the present invention. The layout pattern is adapted to an optical encoder that outputs 4-phase signals. The optical encoder is designed to remove harmonic components that are 1/l, 1/m, 1/n and 1/o times (l=3, m=5, n=7, 0=11) the displacement signal.

P represent the pitch of the first grating, and the width of the photo sensitive elements 31 is represented by P/2. When a particular photo sensitive element 31, as a reference, assigned for the signal a is designated 31a, the next 31a is placed at 3P+P/14. The photo sensitive elements are then placed, in succession from the reference, at 6P+18P/154, 9P+P/6, 12P+14P/66, 15P+10P/42, 18P+131P/462, 21P+71P/210, 24P+886P/2310, 27P+103P/330, 30P+8P/30, 33P+167P/770, 36P+12P/70, 39P+16P/110, 42P+P/10, 45P+P/22, 48P, . . . . The phase differences of the photo sensitive elements are four types of phase differences P/(2·l), P/(2·m), P/(2·n) and P/(2·o) and the ones determined by the sum of a combination of these phase differences (l=3, m=5, n=7 and o=11). As long as the phase differences as described above are included, the order in the layout from right to left or vice versa is not limited and any order in the layout is acceptable. It is also possible to arrange the photo sensitive elements at spacings as equal as possible therebetween.

Unlike the layout pattern in the first and second examples, the fourth example removes not only the third harmonic and fifth harmonic distortion components but also the seventh harmonic and 11-th harmonic distortion components. The photo sensitive elements 31b for the signal b are placed in the pattern that presents a phase difference of P/4 relative to the photo sensitive elements 31a. In the alternate example shown in FIG. 7, the photo sensitive elements 31b are spaced of P/4 apart from the photo sensitive elements 31a. A first photo sensitive element 31b is spaced from the reference by 3P/4, and subsequent photo sensitive elements 31b are placed at 15P/4+P/14, 27P/4+18P/154, 39P/4+P/6, 51P/4+14P/66, 63P/4+10P/42, . . . , 183P/4+P/22, 195P/4, . . . . The photo sensitive elements 31a/, 31b/ are arranged with phase differences P/2, 3P/4, respectively, relative to the photo sensitive elements 31a. In summary, this layout pattern allows for a total of 64 photo sensitive elements, including the photo sensitive elements 31a/ and 31b/, to be repeatedly arranged with a period of 48P. The order in the layout from left to right or vice versa is not important. The layout pattern of the photo sensitive elements 31a and 31b may be repeated with different phase differences or a different order in the layout pattern from left to right or vice versa may be employed. This is true of the layout pattern of the photo sensitive elements 31a/ and 31b/. Spacings between the photo sensitive elements 31 may be set to be wider, although it lower efficiency would result. It is also acceptable to arrange more than one photo sensitive elements of the same series, for example, two or more 31a, in succession.

The signal Ia derived from the photo sensitive elements 31a has P as its fundamental period, and the signal does not contain the third, fifth, seventh, ninth and 11-th harmonic distortion components. This is because the photo sensitive elements 31a are placed in the pattern that cancels out these components. The signal Ia is also free from even-order harmonic components. The same is true of the signals Ib, Ia/ and Ib/. One period of 64 photo sensitive elements is acceptable in the layout pattern. More than one period is also acceptable. Furthermore, to remove the 13-th harmonic distortion components, the layout pattern simply needs to be formed so as to include a phase difference of P/(2·13) with p=13. The 17-th harmonic, 19th harmonic components and higher order harmonic components may be removed in the same manner.

In this example, no pattern is provided to remove the ninth harmonic distortion components between the seventh and 11-th harmonics. The ninth-order has the third-order as its factor, and the layout pattern for the third harmonic the ninth harmonic distortion components as well, and providing the layout pattern for removing the prime number's harmonic components is sufficient for removal of the higher order's harmonic components having the prime number as its factor. The photo sensitive section 3 may be housed in a resin molded package or can be packaged so as to assure resistance to environment. The photo sensitive section 3 may be housed in a ceramic or metal package to protect its photo sensitive face with glass, resin or the like. As already described in the first alternate example of the embodiment of the present invention, the photo sensitive elements may be interconnected so that a differential between Ia and Ia/ and a differential between Ib and Ib/ are obtained.

The present invention is applied not only to the optical encoders described above, but also to magnetic, electromagnetic and electrostatic capacity type encoders. The present invention is applied regardless of whether the pitch of the first scale is approximately equal to the average pitch of the second grating 2 or whether both pitches are different, for example, with a pitch ratio of 1:2. The width of each photo sensitive element is not limited to P/2. The present invention does not require the widths of the photo sensitive elements to be uniform.

According to the optical encoder of the present invention, the photo sensitive elements for each of the phases are formed in a mixed fashion and in a grating configuration on the photoelectric conversion elements, and pickup of each phase is performed on the same area. Thus, highly accurate position detection is performed even with the effect of dirt, blemishes, or errors of the first scale and even with variations in parallelism and intensity of the incident light. Furthermore, a high utilization of light results in improvements in power consumption, heat generation and service life, and consequently allows for a compact design.

The optical encoder of the present invention has the photo sensitive elements arranged with uneven spacings therebetween and is able to distortion components of low to high orders thus permitting a high accuracy position determination. The optical encoder allows a machine tool to perform precision machining in an easy manner, thereby contributing to improved production efficiency.

What is claimed is:

1. An optical encoder for determining a relative position based on a plurality of signals having a predetermined phase difference therebetween, said optical encoder comprising:

a first scale having a pattern formed thereon in a lengthwise direction, the pattern having a pattern width;

a second scale moveable in the lengthwise direction relative to said first scale, said second scale comprising a plurality of groups wherein each of said plurality of groups comprises a plurality of photo sensitive elements arranged in predetermined patterns, wherein each of said plurality of groups corresponds to one of the plurality of signals, wherein said plurality of photo sensitive elements from different groups are arranged side-by-side in a mixed fashion along the lengthwise direction of said second scale, wherein each of said plurality of photo sensitive elements has a width corresponding to the pattern width of the pattern of said first scale, and wherein said groups of photo sensitive elements are arranged such that the plurality of signals have the predetermined phase difference therebetween.

2. An optical encoder according to claim 1, wherein a separation between said plurality of photo sensitive elements arranged in the predetermined patterns of said second scale is not greater than P/4, wherein P is a period of the signals.

3. An optical encoder according to claim 2, wherein the plurality of signals correspond to four phase signals, wherein one phase signal of said four phase signals is a reference phase and said plurality of photo sensitive elements are arranged such that the other three phases are P-P/4, 2P-P/2, 3P-3P/4, wherein P is the period of the signals.

4. An optical encoder according to claim 2, wherein each of said plurality of photo sensitive elements belonging to a same group of said plurality of groups are therebetween unequally spaced for each signal of the plurality of signals, wherein one of said plurality of photo sensitive elements of each of said plurality of groups is set as a reference and the remaining photo sensitive elements of each of said plurality of groups are arranged so as to have phase differences of k×P, P/(2·l), P/(2·m), P/(2·n), P/(2·o), and with phase differences corresponding to sums of a combination of these phase differences, wherein k is a positive integer, P is the period of the signals, and l, m, n, and o are positive integers.

5. An optical encoder according to claim 2, wherein the plurality of signals comprise two phase signals, wherein one phase signal of said two phase signals is a reference phase signal and said plurality of photosensitive elements are arranged such that the predetermined phase difference between said two phase signals is ±P/4, wherein P is the period of the signals.

6. An optical encoder according to claim 1, wherein each of said plurality of photo sensitive elements has a width that is approximately half a pitch of the pattern of said first scale.

7. An optical encoder according to claim 5, wherein each of said plurality of photo sensitive elements has a width that is approximately half a pitch of the pattern of said first scale.

* * * * *